United States Patent [19]
Hoefler et al.

[11] Patent Number: 6,000,887
[45] Date of Patent: Dec. 14, 1999

[54] STIFF DRILL

[75] Inventors: Brian D. Hoefler; Sumanth Kumar, both of Rockford, Ill.

[73] Assignee: Ingersoll Cutting Tool Company, Rockford, Ill.

[21] Appl. No.: 09/081,379

[22] Filed: May 19, 1998

[51] Int. Cl.[6] .................................................. B23B 51/02
[52] U.S. Cl. ........................................ 408/230; 408/229
[58] Field of Search .................................. 408/227, 229, 408/230

[56] References Cited

U.S. PATENT DOCUMENTS

| | | |
|---|---|---|
| 190,307 | 5/1877 | Goddard . |
| 2,084,737 | 6/1937 | Magnus . |
| 2,377,329 | 6/1945 | Dettmer . |
| 3,292,237 | 12/1966 | Fisher . |
| 3,863,316 | 2/1975 | Yeo . |
| 3,963,365 | 6/1976 | Shallenberger, Jr. .................. 408/186 |
| 4,124,328 | 11/1978 | Hopkins .................................. 408/223 |
| 4,149,821 | 4/1979 | Faber ..................................... 408/199 |
| 4,230,429 | 10/1980 | Eckle ..................................... 408/186 |
| 4,268,198 | 5/1981 | Peters ..................................... 408/186 |
| 4,480,949 | 11/1984 | Van De Bogart ........................ 407/54 |
| 4,563,113 | 1/1986 | Ebenhoch ............................... 408/223 |
| 4,618,296 | 10/1986 | Allaire et al. .............................. 407/42 |
| 4,676,702 | 6/1987 | Reinauer ................................. 408/144 |
| 4,687,387 | 8/1987 | Roos ...................................... 408/144 |
| 4,932,815 | 6/1990 | Krauss ................................... 408/224 |
| 4,984,943 | 1/1991 | Hamilton ............................... 408/144 |
| 5,049,011 | 9/1991 | Bohnet et al. .......................... 408/223 |
| 5,143,490 | 9/1992 | Kopras ..................................... 408/26 |
| 5,269,618 | 12/1993 | Meyer .................................... 408/188 |
| 5,302,059 | 4/1994 | Fabiano ................................. 408/223 |
| 5,323,823 | 6/1994 | Kopras ................................... 144/219 |
| 5,429,458 | 7/1995 | Tukala et al. ............................ 408/223 |
| 5,509,761 | 4/1996 | Grossman et al. ........................ 408/59 |
| 5,704,740 | 1/1998 | Ebenhoch et al. ...................... 408/229 |
| 5,788,431 | 8/1998 | Basteck .................................. 408/229 |
| 5,816,754 | 10/1998 | Shallenberger ......................... 408/229 |

*Primary Examiner*—Steven C. Bishop
*Attorney, Agent, or Firm*—Fitch, Even, Tabin & Flannery

[57] ABSTRACT

A generally cylindrical drill, particularly an insert drill having multiple cutting inserts, helical chip grooves to clear the chips from the hole, and a gripping shank opposite the cutting end of the drill, wherein the drill experiences an unbalanced resultant transverse force upon the cutting tip of the drill, and that resultant is oriented perpendicularly to an axial plane containing the neutral axis of the maximum resistive moment at the grooved section of maximum bending stress adjacent to its juncture with the gripping shank.

5 Claims, 1 Drawing Sheet

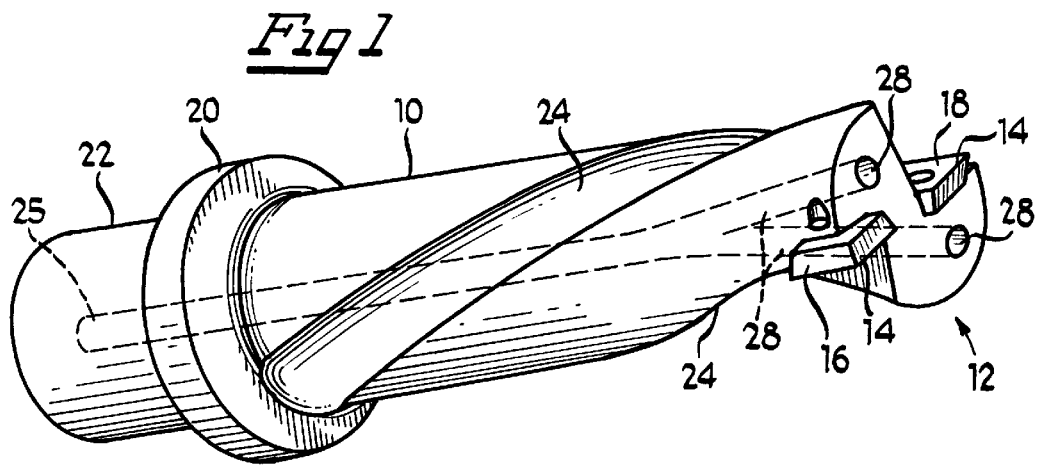
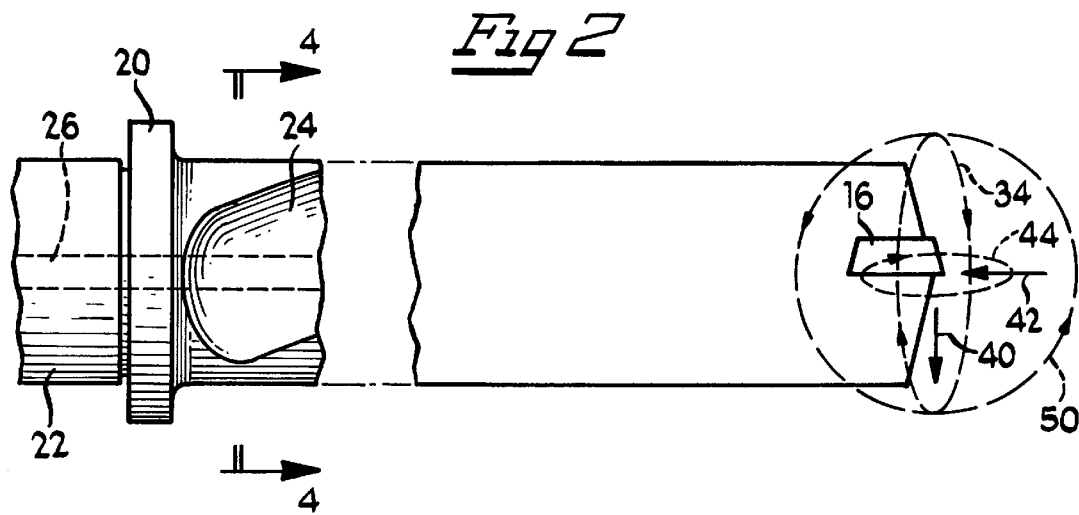
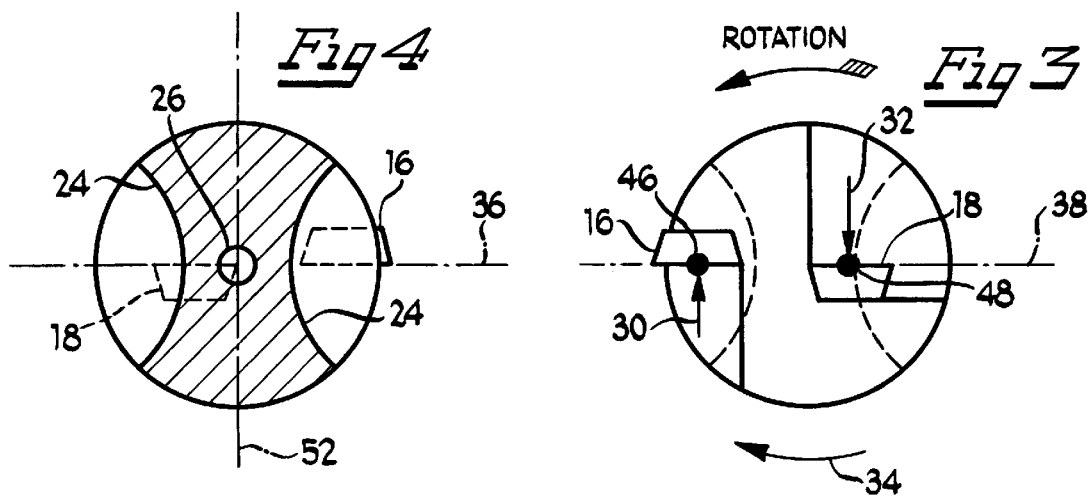

STIFF DRILL

BACKGROUND OF THE INVENTION

1. Field of the Invention

This invention relates to drills for use in metal, and in particular to drills designed for high feed rates that place a premium upon resistance to bending.

2. Background and Description of Related Art

When operating at the very high metal removal rates desirable in high production drilling, the heaviest component of the reaction to the cutting force has been found to be axial in nature, amounting, in some instances, to ninety percent (90%) of the cutting force. In this kind of service, the maintenance of tolerances on hole size is largely dependent upon the resistance of the fluted drill body to both bending and buckling under the cutting load, which, even with the rarely achievable balanced distribution of the transverse cutting forces, is largely a question of the stiffness of the fluted drill body, as a beam and as a column, under the major load components resulting from high feed rates.

The problem of deflection of metal drills has largely been addressed in the prior art as one of balancing the transverse forces upon the cutting tip for the elimination, to the extent possible, of a transverse resultant. While some prior art drills have approached desirable stiffness by shortening the fluted drill body, the significant criteria for drill stiffness appear to have remained undiscovered by the prior art.

SUMMARY OF THE INVENTION

In briefest terms, the invention accomplishes maximum resistance to flexure of the fluted drill body by rotatively aligning the fluted cross section from the drill tip to its juncture with the shank, so that its maximum resisting moment is available to oppose the applied bending moment. Put another way, the rotative orientation at that juncture should place the neutral axis of highest resistance to bending perpendicular to the line of action of any net transverse force and moment at the drill tip, which, in the usual case of diametrically aligned cutting edges, is accomplished by aligning that neutral axis parallel to the cutting edges of the drill.

DESCRIPTION OF THE DRAWINGS

In the drawings,

FIG. 1 is a perspective view of a drill in accordance with the invention;

FIG. 2 is an elevational view of the drill of FIG. 1, partially diagrammatic, showing the forces acting upon it while cutting;

FIG. 3 is a diagrammatic end view of the drill as seen in FIG. 2, showing thereon in more detail the transverse forces acting upon the rake faces of the cutting inserts in operation; and FIG. 4 is a sectional view of the drill taken on the line 4—4 of FIG. 2.

DETAILED DESCRIPTION OF THE INVENTION

While a properly ground, double-edged twist drill can approach or even achieve zero net transverse forces on the drill face before uneven wear of the cutting edges upsets the balance of forces, the transverse forces on the body of an insert drill are inherently unbalanced when but two inserts are provided, disposed respectively on opposite sides of the rotational axis and each sweeping only a portion of the radius of the cut. Insert drills therefore typically exhibit a low length-to-diameter ratio for greater resistance to bending in response to the net transverse force at the cutting end. At high feed rates, however, the axial forces on the drill body, compressive in nature, can add a further couple in a plane at right angles to the net transverse force acting at the cutting tip. This tends to increase the radial deflection that would be caused by the deflection of the drill due to unbalanced transverse forces alone.

The drill of the invention seeks to maintain hole size and roundness within tight tolerance against the applied moments by careful rotative orientation of the fluted section of the drill body at the section of maximum bending stress, which is experienced in the fluted drill body adjacent to the flange of the gripping shank near the location of the maximum moment of the applied transverse load at the tool tip. Specifically, the desired orientation is that which results from selection of the helix angle of the flutes so as to place the neutral axis of maximum resisting moment perpendicular to the line of action of the resultant transverse force at the tool tip. In the symmetrical "hour glass" configuration of FIG. 4, the main axis of symmetry is preferred as the neutral axis of the section of maximum bending stress, which, in the case of diametrically aligned cutting inserts, places the main axis of symmetry in a common axial plane with the cutting edges of the inserts.

In the drawings, the cylindrical tool body 10 is shown in FIG. 1 in a three-quarter view toward the cutting tip 12, i.e., illustrating a diametrical alignment of the cutting edges 14 of two oppositely facing cutting inserts 16 and 18. The ratio of the unsupported length of the drill of the invention to its cutting diameter is in excess of 3, preferably about 4, measuring from the flange 20 of the gripping shank 22. Cutting fluid is conveyed from the machine spindle to the cutting tip 12 by an axial channel 26 which is drilled from the gripping shank 22 of the drill body 10, and which is joined by diagonal branch channels 28 drilled from the cutting tip.

In the illustrated case, chip flutes 24 recede from the cutting tip 12 in the preferred left-hand helix notwithstanding the facing of the cutting inserts 16 and 18 for right-hand rotation (clockwise when viewed from the end opposite the cutting tip).

With the opposite handed helical configuration illustrated, the stated alignment of cutting edges with the neutral axis of greatest moment at the critical section (FIG. 4) is achieved with approximately three-eighths of a turn of the helix. For helical flutes of the same hand as the cutting direction, approximately five-eighths of a turn are needed to achieve the desired orientation.

The reason for preferring the opposite handed chip groove helix, although optional from the standpoint of the utility of this invention, is the theoretical tendency of the tool body to contract its radial dimension under high torsional load, rather than to expand radially, as would be the case if the helix turned in the direction of cutting rotation. These considerations are thought to become significant only under conditions of extraordinary cutting speed and feed which seek nevertheless to hold close tolerances of hole size and roundness.

FIG. 3 of the drawings illustrates diagrammatically the location of the transverse forces 30 and 32 acting respectively upon the faces of the cutting inserts 16 and 18 and the torsional moment 34 which they combine to produce. FIG. 3 also illustrates diagrammatically in broken line outline the cross section of the tool body 10 at the point there along of highest bending stress experienced by the fluted drill body, namely at the section indicated by the line 4—4 of FIG. 2, and shown in solid line in FIG. 4, which indicates the relative location of the cutting inserts 16 and 18 in broken lines. With the idealized symmetrical form of cross section shown in FIGS. 3 and 4 for section 4—4 of FIG. 2, the symmetry axis 36 at that section is placed in the same axial plane as the cutting edge diameter 38 (FIG. 3), with the facial forces 30 and 32 on the cutting inserts 16 and 18, and their resultant 40, perpendicular to that plane. This arrangement places the maximum available moment of resistance to bending at section 4—4 in proper alignment to resist the bending moment at that section caused by the resultant transverse force 40 (FIG. 2) exerted upon the cutting tip of the tool. The arrow representing the transverse resultant 40 points downwardly in FIG. 2 because of the greater face force upon the inner insert 18.

FIG. 2 also depicts an axial force 42 acting upon the tool as though at its center, and the further bending moment 44, resulting from the eccentric axial loading of tool body 10 by the axial forces 46 and 48 acting upon the two cutting inserts 16 and 18 individually.

It will also be appreciated that any bending of the tool body about the section 4—4 of FIG. 2 caused by the moment of the transverse resultant 40 about that section, will shift the resultant axial force 42 in the direction of the bending force 40, causing the offset resultant axial force 42 to produce yet another couple 50 acting in a direction to increase the bending moment of the transverse bending force 40, with cumulative effect upon the radial deflection of the cutting tip of the tool.

Both considerations, i.e., deflection due to transverse load at the tool tip, and the coplanar transverse-load reinforcing couple 50, are resisted optimally in the tool of the invention by placing the neutral axis 36 of maximum moment of inertia of the section 4—4 of FIG. 2 in a common axial plane with the cutting edge diameter 38 so as to present that section's maximum moment of resistance to the bending moment caused by the unbalanced transverse resultant 40 and its reinforcing couple 50.

This alignment coincidentally places the secondary axis of symmetry 52 (FIG. 4) perpendicular to the plane of the moment 44 resulting from the eccentric axial loading of the tool body 10 by the axial forces 46 and 48 acting upon the outboard and inboard inserts 16 and 18, respectively. Fortuitously, this results in the greatest resistance to bending in the axial plane 36–38 that is consistent with orienting the maximum available resisting moment at the section 4—4 of FIG. 2 to oppose the moment of the concentrated transverse load on the tip of the tool.

The preceding detailed description of the drill of the invention ignores the possibility of a detractive effect, upon the preferred relative rotative alignments discussed, of torsional deflection of the fluted tool body from the moment 34 of the individual face forces on the inserts. The absence of discussion of that possibility simply reflects the fact that analysis of torsional deflection, at the length to diameter ratios earlier herein stated, showed it to be negligible under heavy anticipated loads.

The preceding discussion of principle proceeded upon the illustrative example of a drill of two cutting inserts having their cutting edges diametrically arrayed, which may be regarded as typical for small drill sizes, but not necessarily exclusive. The inserts of larger drills may be greater in number, and conceivably be differently arrayed.

The principles herein disclosed are nevertheless applicable, the primary consideration being that the critical section of the fluted tool body remote from the tool tip be oriented rotatively to present its maximum resistive moment to the bending moment at that section resulting from unbalanced transverse load at the tool tip.

Similarly, while those principles are disclosed here in connection with drills whose cutting edges are provided by indexable/replaceable inserts, they are equally applicable to drills having cutting edges integral with the drill body.

The features of the invention believed new and patentable are set forth in the following claims.

What is claimed is:

1. A rotary drill having an elongated generally cylindrical body with diametrically aligned cutting edges at one end thereof on opposite sides of the rotational axis, and a shank portion at the opposite end thereof adapted for insertion into the grip of a tool holder for rotation of the drill with axial feed, said body also having a pair of opposed chip grooves therein extending helically from said cutting edges to said shank portion to convey chips away from said cutting edges, said aligned cutting edges being oriented generally parallel to the neutral axis of maximum resistive moment of the cross-section of the grooved body at the merger of said grooved and shank portions of said body.

2. The rotary drill of claim 1 wherein said chip grooves are generally symmetrical about said rotational axis.

3. The rotary drill of claim 1 wherein said chip grooves at said cross-section are bilaterally symmetrical about two perpendicular diameters of the drill body, one of which coincides with said neutral axis, the hand of the helical chip grooves is opposite to the hand of the cutting direction of rotation, and said helical grooves extend to said shank portion in approximately three-eighths of a turn of the helix.

4. The rotary drill of claim 1 wherein said chip grooves at said cross-section are bilaterally symmetrical about two perpendicular diameters of the drill body, one of which coincides with said neutral axis, the hand of the helical chip grooves is the same as the hand of the cutting direction of rotation, and said helical grooves extend to said shank portion in approximately five-eighths of a turn of the helix.

5. The rotary drill of claim 3 or 4 wherein the grooved cylindrical body thereof has a length to diameter ratio exceeding three.

* * * * *